(No Model.)

J. STROMEYER.
SKID.

No. 351,476. Patented Oct. 26, 1886.

WITNESSES:
Peter B. Maer
John F. Belsterling

INVENTOR
Julius Stromeyer
by his attorney
Thomas D. Mowlds

UNITED STATES PATENT OFFICE.

JULIUS STROMEYER, OF PHILADELPHIA, PENNSYLVANIA.

SKID.

SPECIFICATION forming part of Letters Patent No. 351,476, dated October 26, 1886.

Application filed April 17, 1886. Serial No. 199,186. (No model.)

*To all whom it may concern:*

Be it known that I, JULIUS STROMEYER, a citizen of the United States, residing at Philadelphia, in the county of Philadelphia and State of Pennsylvania, have invented certain new and useful Improvements in Skids for Loading and Unloading Wagons; and I do hereby declare the following to be a full, clear, and exact description of the invention, such as will enable others skilled in the art to which it appertains to make and use the same.

My invention relates to skids for loading and unloading wagons, trucks, and other vehicles; and the improvement consists in the construction and arrangement of the several parts, as will be hereinafter described, and more particularly pointed out in the claim.

Figure 1:
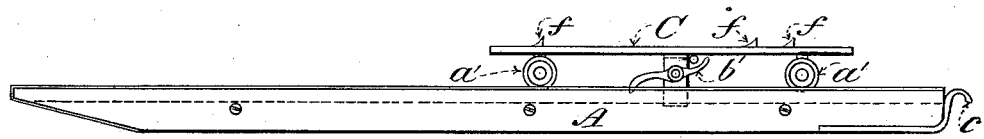
Figure 2:
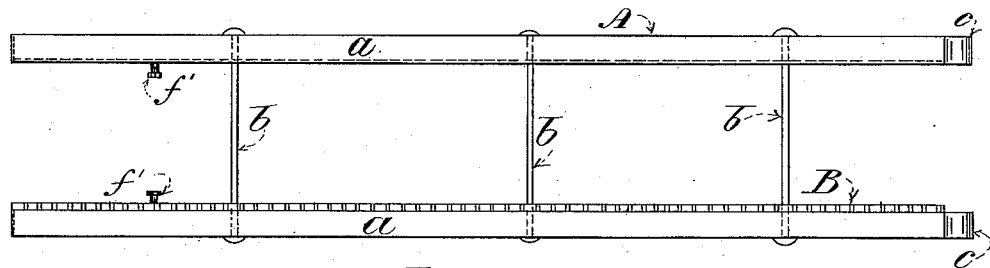
Figure 3:
Figure 4:
Figure 6:
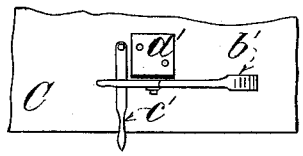
Figure 5:
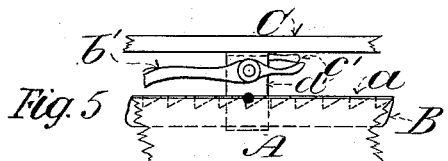

In the accompanying drawings, Figure 1 is a side elevation of my improved skids. Fig. 2 is a plan with the truck removed. Fig. 3 is a cross-section through the truck and skids. Figs. 4 and 5 are partial elevations showing the arrangement of the brake. Fig. 6 is an inverted plan of the truck, showing the brake attached thereto.

A A are the sides of the skids. These sides are made of stout wooden beams secured together in the usual manner.

$a\ a$ are flat metal tracks secured on the upper surface of each of the sides A.

$b\ b$ are the braces connecting the sides together.

B is a toothed rack extending the whole length of the skids and secured on one of the sides A.

$c\ c$ are two end irons secured to the ends of the sides A, for the purpose of attaching the skids to the end of the wagon to be loaded or unloaded.

C is a movable truck secured on the top of the skids, as shown in Fig. 1.

$d$ is a stout iron brace secured to the under side of the truck, and having its free end bent at right angles, so as to come under the extending edge of one of the tracks $a$, as shown in Fig. 3.

$d'$ is another brace, similar to $d$, but fitting under the bottom of the toothed rack B.

$a'\ a'$ are the wheels of the truck.

$b'$ is a pawl or catch secured under the truck, and pivoted upon the brace $d'$, so as to engage with the toothed rack B.

$c'$ is a brake-lever secured on the under side of the truck, and operating the pawl or catch $b'$.

$f\ f$ are metal spurs or projections on the upper surface of the truck C, for the purpose of preventing the articles that are being loaded from slipping off.

$f'\ f'$ are two stops on the lower ends of the sides A, for preventing the truck from being removed from that end.

When loading, the skids are adjusted with the end irons, $c\ c$, secured to the tail of the wagon in the usual way, with the opposite end resting upon the ground. The truck C being lowered into position to receive the load, the pawl or catch $b'$ is allowed to engage with the toothed rack B and the loaded truck pushed along toward the tail of the wagon. If desiring to stop at any point for any purpose whatever, it is only necessary to stop pushing, and the truck will be securely held in position by the pawl or catch engaging with the toothed rack B. When desiring to lower the truck from the top to the bottom of the skids, the brake-lever $c'$ is pressed back, so as to hold the pawl or catch $b'$ in the position shown in Fig. 5.

Having thus described my invention, what I claim as new, and desire to secure by United States Letters Patent, is—

The combination of the sides or frame A A, connected by any suitable means, and provided with the tracks $a\ a$, the toothed rack B, extending the whole length of one of the sides A, the truck C, provided with suitable means for rolling along the tracks $a$, and secured in position by the braces $d$ and $d'$, and the pawl or catch $b'$, pivoted to the brace $d'$, and engaging with the teeth in the rack B, substantially as and for the purpose described.

In testimony whereof I affix my signature in presence of two witnesses.

JULIUS STROMEYER.

Witnesses:
 THOMAS D. MOWLDS,
 OTIS EGAN.